(12) United States Patent
Arase et al.

(10) Patent No.: US 6,439,417 B1
(45) Date of Patent: Aug. 27, 2002

(54) FUEL TANK AND VEHICLE EQUIPPED WITH THE SAME

(75) Inventors: Tomoyasu Arase, Toyota (JP); Takashi Ishikawa, Okazaki (JP); Takuya Ishikawa, Toyota (JP); Teijiro Goto, Toyota (JP)

(73) Assignees: Toyota Jidosha Kabushiki Kaisha, Toyota (JP); Horie Kinzoku Kogyo Kabushiki Kaisha, Toyota (JP)

( * ) Notice: Subject to any disclaimer, the term of this patent is extended or adjusted under 35 U.S.C. 154(b) by 0 days.

(21) Appl. No.: 09/369,036

(22) Filed: Aug. 4, 1999

(30) Foreign Application Priority Data

Aug. 21, 1998 (JP) ............................................. 10-235807

(51) Int. Cl.⁷ ................................................. B60P 3/22
(52) U.S. Cl. ........................ 220/564; 137/395; 220/562; 280/834
(58) Field of Search ............................... 220/720–723, 220/562, 900, 905, 564; 137/577–583, 395, 396; 280/834

(56) References Cited

U.S. PATENT DOCUMENTS 2,724,418 A * 11/1955 Krupp ........................ 220/720
2,736,356 A * 2/1956 Bender et al. ............... 220/723
2,758,747 A * 8/1956 Stevens ................... 220/723 X
3,648,886 A * 3/1972 Pringle ........................ 220/723
3,747,800 A * 7/1973 Viland ........................ 220/723
4,008,831 A 2/1977 Vidilles
4,211,208 A * 7/1980 Linder ........................ 220/723
5,596,971 A 1/1997 Kidokoro
5,722,374 A 3/1998 Kidokoro et al.

FOREIGN PATENT DOCUMENTS

JP HEI 8-170568 7/1996
JP HEI 9-5140 1/1997

* cited by examiner

*Primary Examiner*—Stephen P. Garbe
*Assistant Examiner*—Joseph C. Merek
(74) *Attorney, Agent, or Firm*—Kenyon & Kenyon (57) ABSTRACT

A lower wall partially defining a fuel storing chamber of a fuel tank curves upward in accordance a decrease in an amount of fuel stored in the fuel storing chamber. The volume of a gaseous space in the fuel storing chamber is reduced, in comparison with a fuel tank in which a lower wall does not deform, by an amount corresponding to a reduction of the volume of the fuel storing chamber achieved by the curvature of the lower wall. An amount of fuel not discharged from the fuel storing chamber via a fuel passage but remaining near a peripheral end portion of the lower wall of the fuel storing chamber due to the upward curvature of the lower wall is discharged via a residual fuel discharging pipe, so that the residual fuel amount of the fuel storing chamber is minimized.

12 Claims, 10 Drawing Sheets

FUEL TANK AND VEHICLE EQUIPPED WITH THE SAME

INCORPORATION BY REFERENCE

The disclosure of Japanese Patent Application No. HEI 10-235807 filed on Aug. 21, 1998, including the specification, drawings and abstract, is incorporated herein by reference in its entirety.

BACKGROUND OF THE INVENTION

1. Field of the Invention

The present invention relates to a fuel tank for storing fuel and a vehicle equipped with the fuel tank.

2. Description of the Related Art

Japanese Patent Application Laid-open No. HEI 8-170568 discloses a fuel tank that is designed to reduce the capacity of an upper space defined above the surface of liquid fuel in the fuel tank in order to reduce fuel vapor that occurs in the upper space in the fuel tank.

This fuel tank has a fuel storing chamber that is defined by an expandable surrounding bag made of a film, and a housing to which the surrounding film bag is mounted. The surrounding film bag is made up of an upper wall, a lower wall, and bellows-like side walls connecting the upper and lower walls. The lower wall of the surrounding film bag is fixed to a flat bottom wall of the housing.

When fuel is supplied into or discharged from the fuel storing chamber via a fuel passage connected to the fuel storing chamber, the upper wall of the surrounding film bag moves up or down following changes in the amount of fuel present in the fuel storing chamber. Corresponding to the movement of the upper wall, the side walls expand or contract. In this manner, the space defined above the surface of liquid fuel in the fuel storing chamber is controlled or reduced in size.

However, although the bellows side walls of the surrounding film bag of the fuel tank contract in accordance with a decrease in the amount of fuel in the fuel tank, the contraction of the side walls is limited. Therefore, when the amount of fuel in the fuel tank decreases to or below a predetermined level, a substantial upper space capable of holding fuel vapor is created above the surface of liquid fuel. As the amount of fuel further decreases, the upper space increases in size, thereby impeding minimization of fuel vaporization.

SUMMARY OF THE INVENTION

Accordingly, it is an object of the present invention to provide a fuel tank having a fuel storing chamber that changes in capacity in accordance with the amount of fuel stored therein, wherein fuel vaporization can be considerably reduced and a predetermined effective fuel-storing capacity of the fuel storing chamber can be secured. It is another object of the invention to provide a vehicle equipped with such a fuel tank.

In accordance with one aspect of the invention, a fuel tank includes a partition deformable in accordance with an amount of fuel stored in a fuel storing chamber defined by the partition, a fuel passage connected to the fuel storing chamber for supplying fuel to or discharging fuel from the fuel storing chamber, and a residual fuel discharging passage capable of discharging a remaining amount of fuel without being discharged via the fuel passage due to a curvature of a lower wall of the fuel storing chamber occurring when the lower wall curves upwards in accordance with a decrease in the amount of fuel stored in the fuel storing chamber.

In this fuel tank, the lower wall partially defining the fuel storing chamber curves upwards in accordance with a decrease in the amount of fuel stored in the fuel storing chamber. Therefore, the volume of gaseous space in the fuel storing chamber is reduced by an amount corresponding to the reduction in the capacity of the fuel storing chamber caused by the curvature of the lower wall, in comparison with a conventional fuel tank in which a lower wall does not deform. Although the upward curvature of the lower wall may cause an amount of fuel may to remain near a peripheral end portion of the lower wall without being discharged via the fuel passage, this remaining fuel is discharged via the residual fuel discharging passage, thereby minimizing the amount of residual fuel in the fuel storing chamber.

In the fuel tank of the invention, the residual fuel discharging passage may be connected to the fuel storing chamber in such a manner that, when the lower wall is curved, a lower side edge portion of an opening of the residual fuel discharging passage to the fuel storing chamber is lower than an opening of the fuel passage to the fuel storing chamber.

Therefore, a remaining amount of fuel that is not discharged from the fuel storing chamber via the fuel passage remains near a peripheral end portion of the lower wall of the fuel storing chamber due to the upward curvature of the lower wall. This remaining amount of fuel is discharged from the fuel storing chamber via the residual fuel discharging passage connected to the fuel storing chamber, since at the time of the curvature of the lower wall, the lower side edge portion of the opening of the residual fuel discharging passage to the fuel storing chamber is lower than the opening of the fuel passage to the fuel storing chamber.

In the fuel tank of the invention, the fuel storing chamber may be defined by an upper wall having a polygonal shape, a lower wall having a polygonal shape and facing the upper wall, and a peripheral wall extending between the upper wall and the lower wall.

The fuel tank of the invention may further have a construction wherein the fuel passage is connected to the lower wall and the residual fuel discharging passage is connected to the peripheral wall in such a manner that a lower side edge portion of an opening of the residual fuel discharging passage in the peripheral wall is lower than an opening of the fuel passage formed in the lower wall at least when the lower wall is curved to a maximum extent.

Therefore, a remaining amount of fuel not discharged from the fuel storing chamber via the fuel passage is retained near a peripheral end portion of the lower wall of the fuel storing chamber due to the upward curvature of the lower wall. This remaining amount of fuel is discharged from the fuel storing chamber via the residual fuel discharging passage connected to the peripheral wall since at the time of the maximum upward curvature of the lower wall, the lower side edge portion of the opening of the residual fuel discharging passage in the peripheral wall is lower than the opening of the fuel passage in the lower wall.

The fuel tank may also have a construction wherein the fuel passage is connected to the lower wall and wherein the residual fuel discharging passage is connected to the lower wall in such a manner that at least when the lower wall is curved to a maximum extent, a lower side edge portion of an opening of the residual fuel discharging passage in the lower wall is lower than an opening of the fuel passage formed in the lower wall.

Therefore, an amount of fuel that is not discharged from the fuel storing chamber via the fuel passage connected to the lower wall but remaining near a peripheral end portion of the lower wall of the fuel storing chamber due to the upward curvature of the lower wall is discharged from the fuel storing chamber via the residual fuel discharging passage connected to the lower wall, since at the time of the maximum upward curvature of the lower wall, the lower side edge portion of the opening of the residual fuel discharging passage in the lower wall is lower than the opening of the fuel passage in the lower wall.

The fuel passage may be connected to a substantially central portion of the lower wall, and the residual fuel discharging passage may be connected to a portion of the lower wall that is near a corner portion of the lower wall.

The fuel tank may also have a construction wherein the fuel passage is connected to the peripheral wall and wherein the residual fuel discharging passage is connected to the peripheral wall in such a manner that at least when the lower wall is curved to a maximum extent, a lower side edge portion of an opening of the residual fuel discharging passage in the peripheral wall is lower than an uppermost portion of the lower wall and than a lower side edge portion of an opening of the fuel passage in the peripheral wall.

Therefore, an amount of fuel that is not discharged from the fuel storing chamber via the fuel passage connected to the peripheral wall but remains near a peripheral end portion of the lower wall of the fuel storing chamber due to the upward curvature of the lower wall is discharged from the fuel storing chamber via the residual fuel discharging passage connected to the peripheral wall, since at the time of the maximum upward curvature of the lower wall, the lower side edge portion of the opening of the residual fuel discharging passage in the peripheral wall is lower than the uppermost portion of the lower wall and than the lower side edge portion of the opening of the fuel passage in the peripheral wall.

In the fuel tank constructed as described above, the lower wall partially defining the fuel storing chamber curves upwards in accordance with decreases in the amount of fuel stored in the fuel storing chamber. Therefore, the volume of gaseous space in the fuel storing chamber is reduced by an amount corresponding to the reduction in the capacity of the fuel storing chamber achieved by the curvature of the lower wall, in comparison with a conventional fuel tank in which a lower wall does not deform. Hence, fuel vaporization can be considerably reduced. Furthermore, an amount of fuel that is not discharged from the fuel storing chamber via the fuel passage but remains near a peripheral end portion of the lower wall due to the curvature of the lower wall is discharged via the residual fuel discharging passage, so that the residual fuel amount of the fuel storing chamber is minimized. Hence, a predetermined effective fuel-storing capacity of the fuel storing chamber can be secured.

The fuel tank of the invention may further include an auxiliary fuel tank that temporarily stores the fuel. In this case, the residual fuel discharging passage discharges into the auxiliary fuel tank the amount of the fuel that remains without being discharged via the fuel passage.

In accordance with another aspect of the invention, a fuel tank includes a partition deformable in accordance with an amount of a fuel stored in a fuel storing chamber defined by the partition, and a fuel passage connected to the fuel storing chamber for supplying the fuel into the fuel storing chamber or discharging the fuel from the fuel storing chamber. The fuel storing chamber is defined by an upper wall having a polygonal shape, a lower wall having a polygonal shape and facing the upper wall, and a peripheral wall extending between the upper wall and the lower wall. The lower wall curves upwards in accordance with a decrease in the amount of the fuel. The fuel passage is connected to the peripheral wall in such a manner that when the lower wall is curved, a lower side edge portion of an opening of the fuel passage in the peripheral wall is lower than an uppermost portion of the lower wall.

In this fuel tank, the lower wall partially defining the fuel storing chamber curves upwards in accordance with decreases in the amount of fuel stored in the fuel storing chamber. Therefore, the volume of gaseous space in the fuel storing chamber is reduced by an amount corresponding to the reduction in the capacity of the fuel storing chamber achieved by the curvature of the lower wall, in comparison with a conventional fuel tank in which a lower wall does not deform. Furthermore, an amount of fuel that remains near a peripheral end portion of the lower wall of the fuel storing chamber due to the upward curvature of the lower wall is discharged from the fuel storing chamber via the residual fuel discharging passage connected to the peripheral wall, since at the time of the curvature of the lower wall, the lower side edge portion of the opening of the residual fuel discharging passage in the peripheral wall is lower than the uppermost portion of the lower wall. Therefore, this fuel tank can minimize the residual fuel amount of the fuel storing chamber while requiring a simpler construction than the above-described fuel tank according to the first aspect. Hence, it becomes possible to secure a predetermined effective fuel-storing capacity of the fuel storing chamber at low costs.

In accordance with still another aspect of the invention, fuel tank-equipped vehicle includes a fuel tank as in the first aspect, wherein the fuel storing chamber is tilted relative to a horizontal direction, and the residual fuel discharging passage is connected to a substantially lowermost portion of the fuel storing chamber.

In this vehicle, since the fuel storing chamber is tilted relative to a horizontal direction, an amount of fuel remaining in the fuel storing chamber at the time of an upward curvature of the lower wall resides at and near the lowest point in the fuel storing chamber, and therefore can be efficiently discharged via the residual fuel discharging passage. Hence, a predetermined effective fuel-storing capacity of the fuel storing chamber can be secured.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the fuel tank of the present invention will be described in detail hereinafter with reference to the accompanying drawings. Like elements are represented by like numerals in the drawings, and description of like elements will not be repeated.

The fuel tank of the invention is used as, for example, a tank for storing fuel to be supplied to an internal combustion engine. The fuel tank of the invention may also be used as a tank for simply storing fuel.

Figure 1:
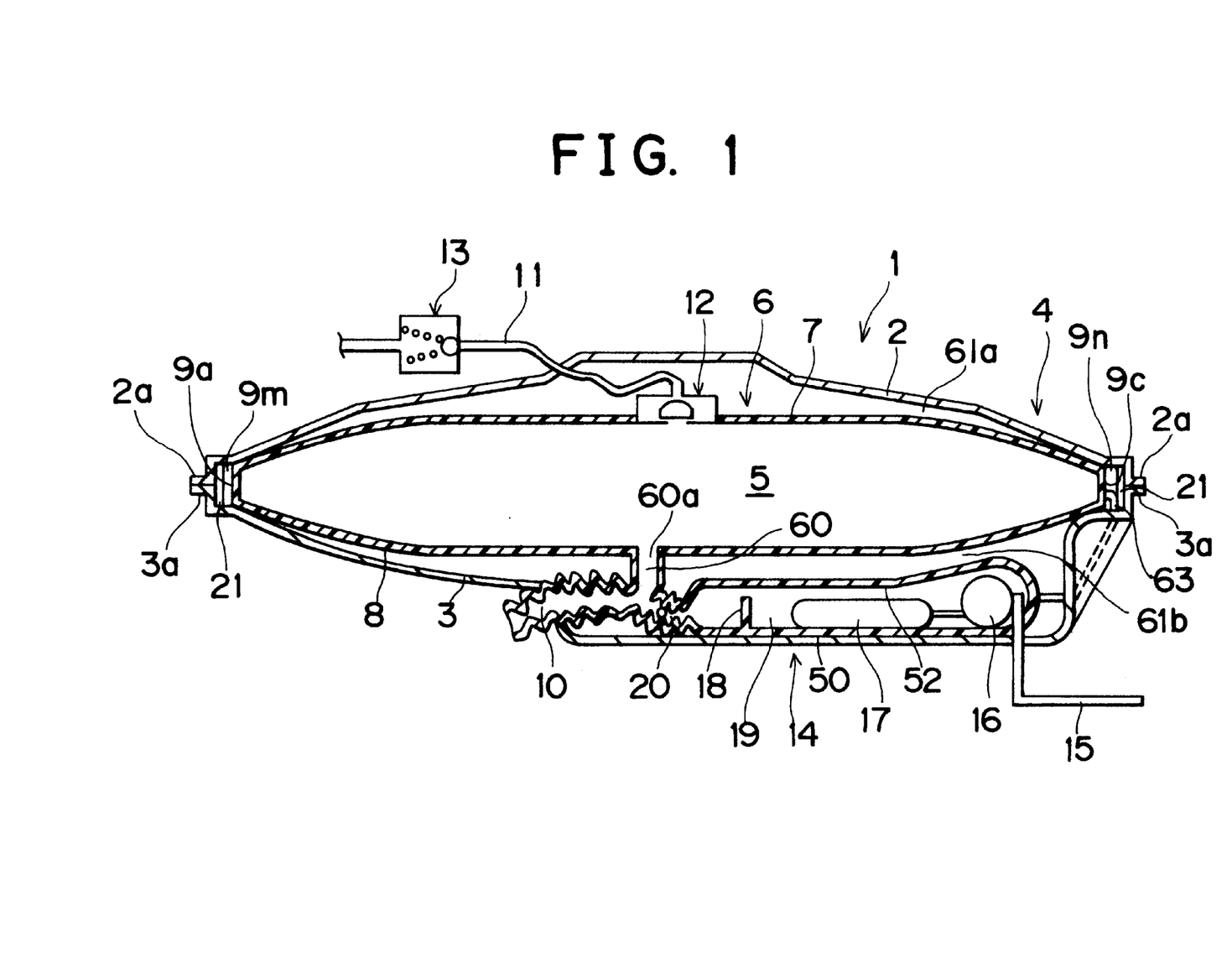
FIG. 1 is a partially sectional view of a fuel tank according to a first embodiment of the invention.

FIG. 1 is a partially sectional view of a fuel tank according to a first embodiment of the invention. A fuel tank 1 has a housing (also termed as tank shell) 4 that forms an exterior of the fuel tank 1. The housing 4 is formed from a material having rigidity, such as a metal, a synthetic resin or the like. The housing 4 is made up of an upper portion 2 and a lower portion 3. The upper portion 2 has an upwardly curved shape, and the lower portion 3 has a downwardly curved shape. The upper portion 2 and the lower portion 3 are tightly joined at flanges 2a, 3a each extending around the entire periphery of the corresponding one of the portions 2, 3.

A partition wall 6 (see FIG. 2) having a generally hexahedral shape is disposed in an internal space defined by the upper portion 2 and the lower portion 3 of the housing 4. Due to provision of the partition wall 6, the internal space of the housing 4 is divided into an upper space 61a above the partition wall 6, a lower space 61b below the partition wall 6, and a fuel storing chamber 5 defined inside the partition wall 6.

Figure 2:
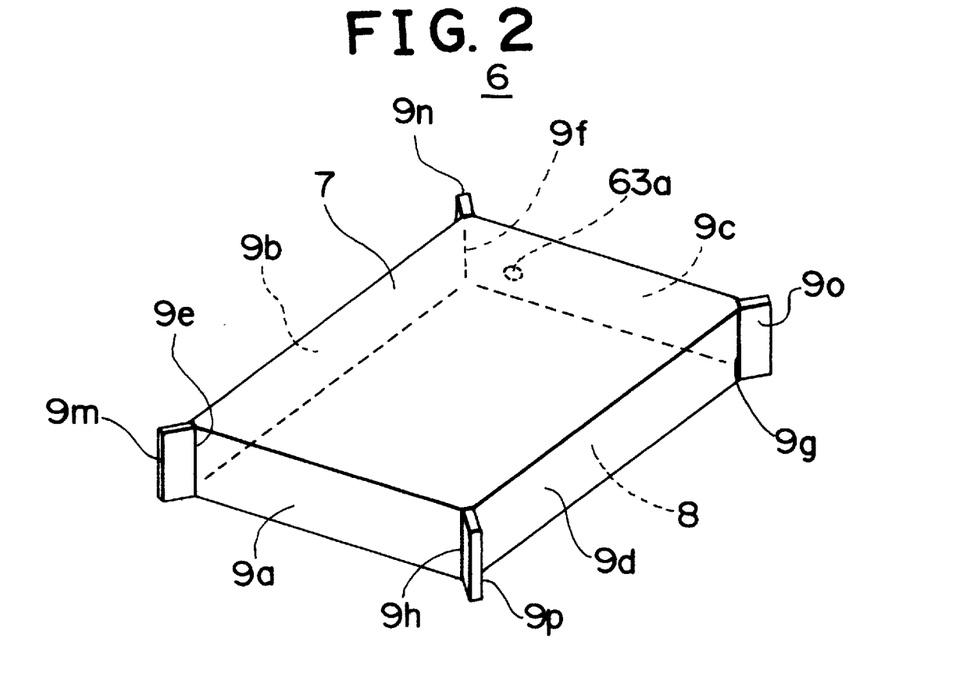
FIG. 2 is a perspective view of a partition wall defining a fuel storing chamber therein, illustrating a basic shape of the partition wall.

The partition wall 6 defining therein the fuel storing chamber 5 has, as a basic shape, a generally rectangular parallelepipedal shape as shown in FIG. 2. The partition wall 6 has an upper wall 7 and a lower wall 8 that have a generally rectangular shape and face each other in vertical directions, and four side walls (peripheral walls) 9a–9d interconnecting the corresponding sides of the upper and lower walls 7, 8. Each of the side walls 9a–9d is connected at its opposite ends to the adjacent side walls. Joint portions 9e–9h are formed between the side walls 9a–9d. The joint portions 9e–9h (corner portions of the rectangular parallelepipedal partition wall 6). A thin platy jaw portion 9m–9p is protruded outward from each joint portion 9e–9h. The jaw portions 9m–9p are formed integrally with the respective joint portions 9e–9h. The jaw portions 9m–9p are provided for supporting the partition wall 6 to the housing 4.

The partition wall 6, having the upper and lower walls 7, 8, the side walls 9a–9d and the jaw portions 9m–9p, is formed from a laminate structure sheet that is produced by, for example, coating both surfaces of a flat core portion of a copolymer resin of ethylene and vinyl, or nylon, with skin portions of a high-density polyethylene. The partition wall 6 substantially has rigidity, and it is deformable.

The area of the upper wall 7 or the lower wall 8 is larger than the area of a side wall. The rigidity of the upper wall 7 and the lower wall 8 is less than that of the side walls 9a–9d. The jaw portions 9m–9p have a greater rigidity than the walls 7, 8, 9a–9d.

Figure 3:
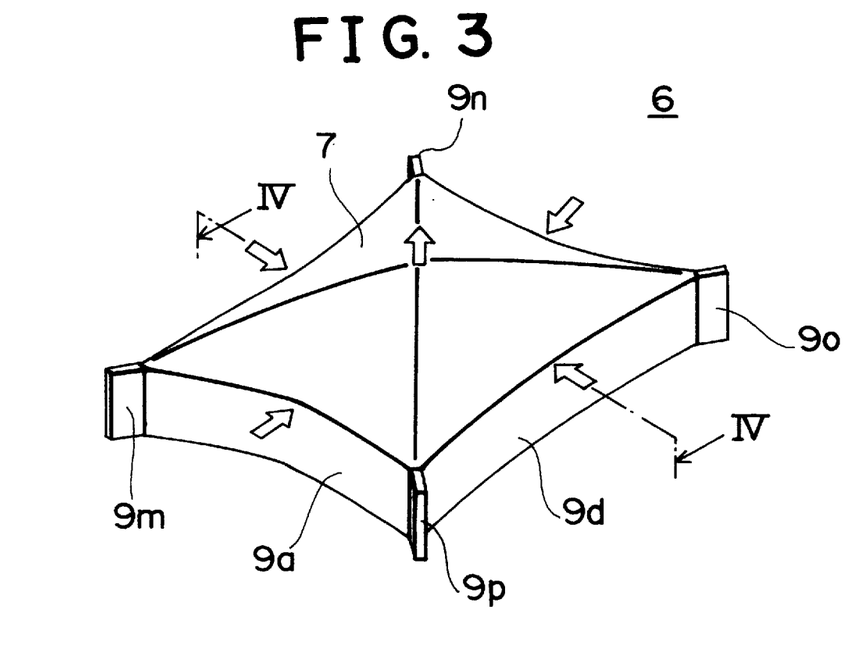
FIG. 3 is a perspective view of the partition wall, illustrating a state that the fuel storing chamber is filled with fuel.
Figure 4:
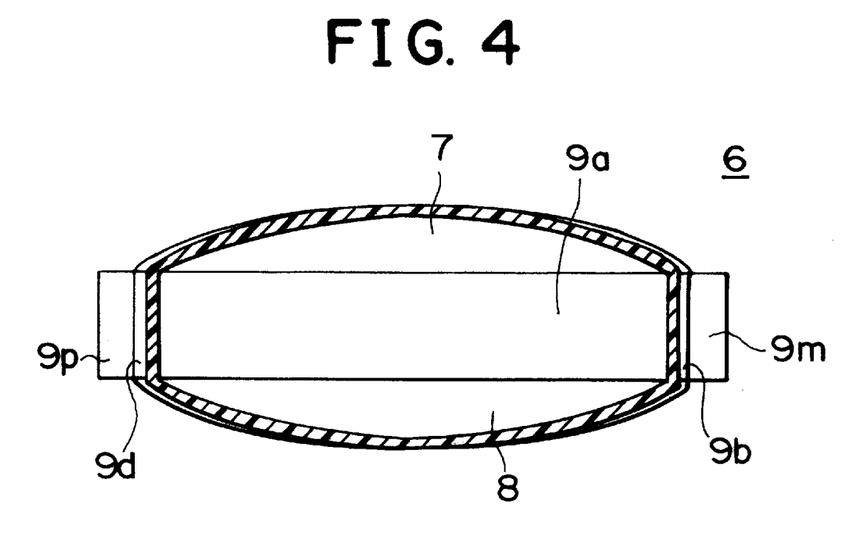
FIG. 4 is a sectional view taken on line IV—IV in FIG. 3.

As described above, the partition wall 6 defines therein the fuel storing chamber 5, which assumes a generally rectangular parallelepipedal shape when the partition wall 6 retains its basic shape. If fuel is supplied into the fuel storing chamber 5 so that the amount of fuel in the fuel storing chamber 5 exceeds an amount of fuel that can be stored into the fuel storing chamber 5 while the generally rectangular parallelepipedal shape of the fuel storing chamber 5 is retained (hereinafter, referred to as "predetermined amount"), the upper wall 7 and the lower wall 8 curve or expand outwards in such a manner as to separate apart from each other, and the side walls 9a–9d curve or sink inwards in such a manner as to come closer to one another, as shown in FIGS. 3 and 4.

That is, if the amount of fuel in the fuel storing chamber 5 exceeds the predetermined amount, the upper wall 7 arches or curves upwards and the lower wall 8 curves downwards, and the side walls 9a–9d curve horizontally inwards. In this manner, the amount of fuel storable in the fuel storing chamber 5, that is, the capacity of the fuel storing chamber 5, gradually increases.

Figure 5:
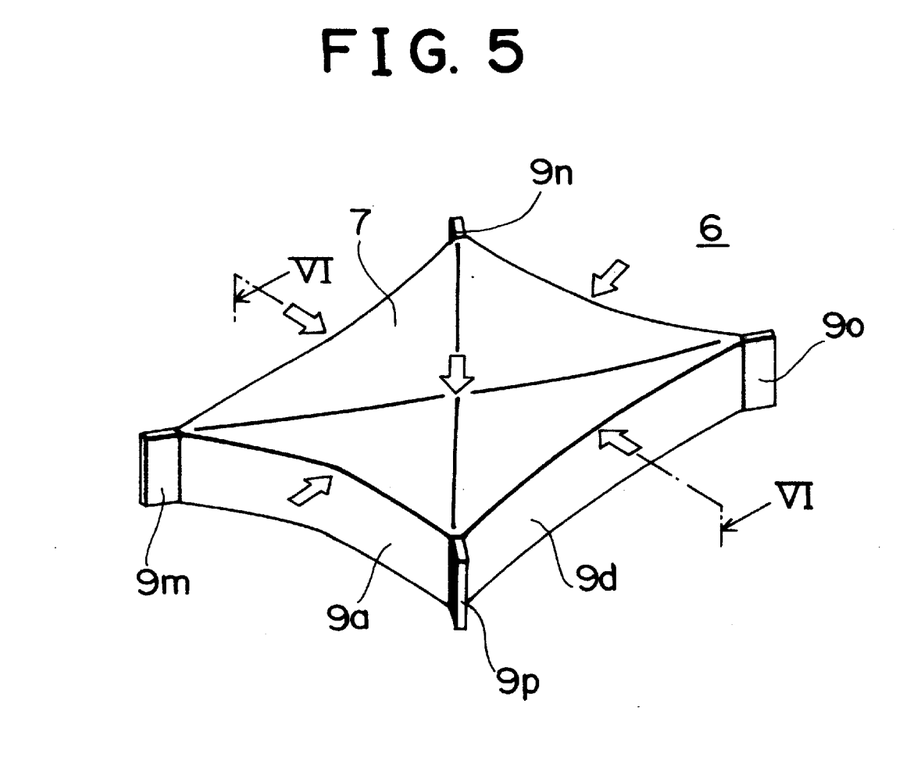
FIG. 5 is a perspective view of the partition wall, illustrating a state that the amount of fuel in the fuel storing chamber has decreased.
Figure 6:
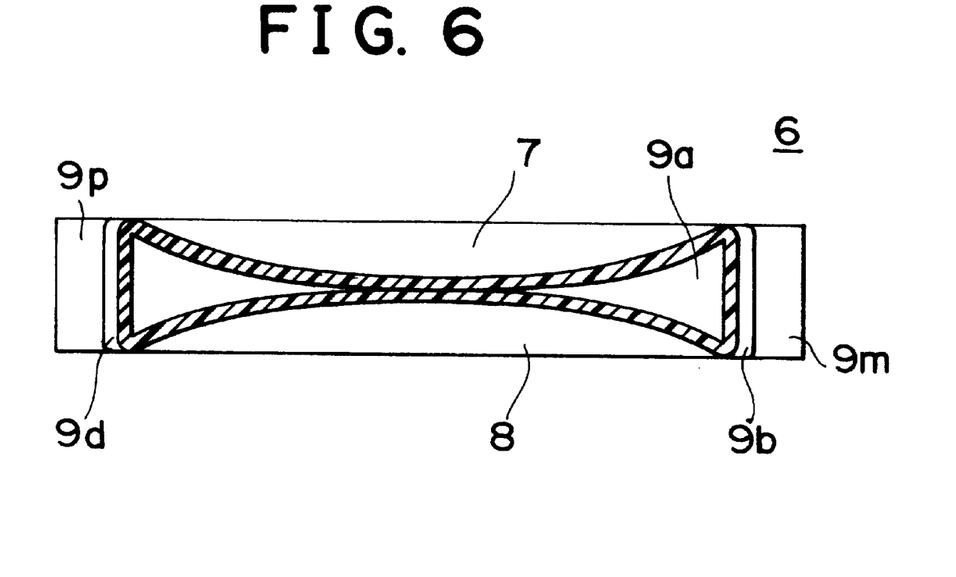
FIG. 6 is a sectional view taken on line VI—VI in FIG. 5.

Conversely, if fuel is discharged out of the fuel storing chamber 5 so that the amount of fuel remaining in the fuel storing chamber 5 becomes less than the predetermined amount, the upper and lower walls 7, 8 curve or dent inwards in such a manner as to come closer to each other, and the side walls 9a–9d curve or dent inwards in such a manner as to come closer to each other, as shown in FIGS. 5 and 6.

That is, if the amount of fuel in the fuel storing chamber 5 becomes less than the predetermined amount, the upper wall 7 curves downwards and the lower wall 8 curves upwards, and the side walls 9a–9d curve horizontally inwards. In this manner, the amount of fuel storable in the fuel storing chamber 5 gradually decreases.

The amount of deformation of each of the upper wall 7 and the lower wall 8 is greater than the amount of deformation of each of the side walls 9a–9d. The amount of deformation of each of the jaw portions 9m–9p is less than the amount of deformation of each of the side walls 9a–9d. Therefore, the upper wall 7 and the lower wall 8 may be considered as great-deformation faces, and the side walls 9a–9d may be considered as small-deformation faces, and the jaw portions 9m–9p may be considered as very small-deformation faces.

Referring back to FIG. 1, a fuel pipe (fuel passage) 60 for supplying fuel to or discharging fuel from the fuel storing chamber 5 is connected to a substantially central portion of the lower wall 8 of the partition wall 6. The fuel pipe 60 branches into a fuel supplying pipe 10 and a fuel introducing pipe 20 that is connected to an auxiliary fuel tank 14 described below.

Fuel introduced via a fuel introducing opening (not shown) is supplied into the fuel storing chamber 5 via the fuel supplying pipe 10 and the fuel pipe 60, and is also supplied into the auxiliary fuel tank 14 via the fuel introducing pipe 20. At the time of fuel discharge, fuel is drawn from the fuel storing chamber 5 into the auxiliary fuel tank 14 via the fuel pipe 60 and the fuel introducing pipe 20.

Junction portions of the fuel supplying pipe 10 and the fuel introducing pipe 20 connecting to the fuel pipe 60 have bellows pipe walls and are expandable and bendable. The junction portions therefore allow curving deformation of the lower wall 8. In this embodiment, the entire length of the fuel introducing pipe 20 is formed by a bellows pipe.

The diameter of the fuel pipe 60 is determined by the amount of fuel to be introduced into the fuel storing chamber 5, and it is normally about 25 mm to about 35 mm. It is normally difficult to connect the fuel pipe 60 to any one of the side walls 9a–9d because the height of the side walls 9a–9d is small. In order to facilitate connection of the fuel pipe 60 to one of the side walls 9a–9d, it may be considered that the connecting mouth of the fuel pipe 60 to a side wall 9a–9d is formed into a rectangular shape (elongated horizontally). However, if the fuel pipe 60 is connected to one of the side walls 9a–9d in this manner, the connecting mouth of the fuel pipe 60 will take up a considerably large area in the relatively small area of the side wall 9a–9d, so that the fuel pipe 60 will impede deformation (displacement) of the connected side wall. Thus, there will be a danger of insufficient deformation of the upper wall 7 and the lower wall 8. Therefore, connecting the fuel pipe 60 to the upper wall 7 or the lower wall 8 is considered more favorable. The upper wall 7 and the lower wall 8 have a relatively large area and, therefore, will not be adversely affected to a great extent by connection of the fuel pipe 60 thereto. However, if the fuel pipe 60 is connected to the upper wall 7, it will be difficult to discharge fuel from the fuel storing chamber 5 via the fuel supplying pipe 10. If the fuel pipe 60 is connected to a portion of the lower wall 8 other than a substantially central portion thereof, deformation of the entire lower wall 8 will become non-uniform. Consequently, in the embodiment, the fuel pipe 60 is connected to a substantially central portion of the lower wall 8 as described above.

A fuel vapor discharging pipe 11 for discharging gas, particularly, fuel vapor, out of the fuel storing chamber 5 is connected to a substantially central portion of the upper wall 7 of the partition wall 6, via a shutoff valve 12. The fuel vapor discharging pipe 11 has flexibility and allows curving deformation of the upper wall 7. The shutoff valve 12 shuts the fuel vapor discharging pipe 11 when the surface of liquid fuel in the fuel storing chamber 5 reaches the shutoff valve 12. The shutoff valve 12 thus prevents leakage of fuel out of the fuel storing chamber 5.

The fuel vapor discharging pipe 11 is connected to an intake passage (not shown) of an internal combustion engine, via a check valve 13, and a charcoal canister (not shown) for temporarily adsorbing fuel vapor. Fuel vapor is released from the charcoal canister into the intake passage in accordance with the operating condition of the internal combustion engine.

The check valve 13 opens when the pressure in the fuel vapor discharging pipe 11 between the check valve 13 and the shutoff valve 12 exceeds a predetermined positive pressure. The check valve 13 closes when the pressure becomes lower than the predetermined positive pressure. This operation of the check valve 13 prevents gas from entering the fuel storing chamber 5 after the shutoff valve 12 is shut.

The auxiliary fuel tank 14 for temporarily storing fuel from the fuel storing chamber 5 is disposed on the lower portion 3 of the housing 4, more specifically, under a portion of the lower wall 8 that extends substantially between the opening of the fuel pipe 60 and the side wall 9c. The auxiliary fuel tank 14 contains a fuel pump 16 for pumping fuel from the auxiliary fuel tank 14 to fuel injection valves (not shown) of the internal combustion engine via a fuel conveying pipe 15. The fuel pump 16 draws in fuel via a filter 17 that filters out dust or the like from fuel, regulates the fuel pressure to a predetermined pressure, and pumps out fuel to the fuel injection valves.

Figure 7:
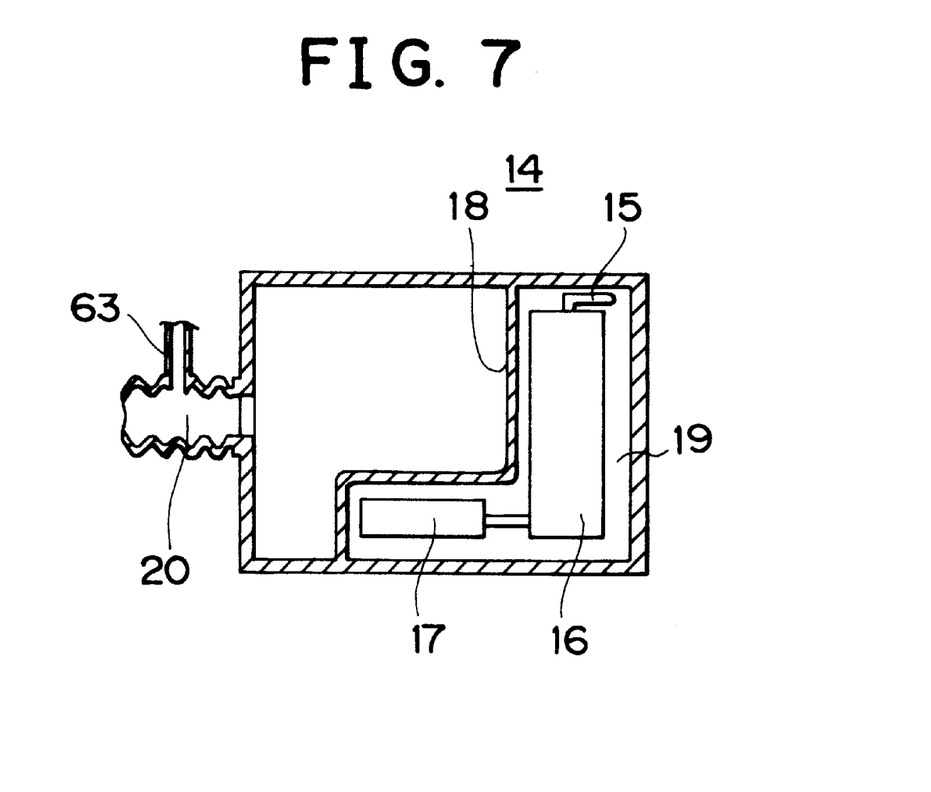
FIG. 7 is a plan sectional view of an auxiliary fuel tank.

A divider wall 18 extends substantially vertically upward from a lower wall 50 of the auxiliary fuel tank 14. As shown in FIG. 7, the divider wall 18 partially defines an accommodation chamber 19 for disposing the fuel pump 16 and the filter 17. The accommodation chamber 19 prevents exhaustion of fuel from the vicinity of the filter 17 when the auxiliary fuel tank 14 is inclined so that the surface of liquid fuel in the auxiliary fuel tank 14 tilts.

As shown in FIG. 1, a lower surface of the upper portion 2 of the housing 4 conforms to a shape of the upper wall 7 of the partition wall 6 assumed when the upper wall 7 curves upwards. Similarly, an upper surface of an upper wall 52 of the auxiliary fuel tank 14 and an upper surface of a portion of the lower portion 3 of the housing 4, the portion being located under a portion of the lower wall 8 extending substantially between the fuel pipe 60 and the side wall 9a (hereinafter, the portion of the lower portion 3 will be referred to simply as "predetermined portion of the lower portion 3") conform to a shape of the lower wall 8 of the partition wall 6 assumed when the lower wall 8 curves downwards.

Therefore, when the lower wall 8 of the partition wall 6 curves downwards and contacts the upper surface of the upper wall 52 of the auxiliary fuel tank 14 and the upper surface of the predetermined portion of the lower portion 3 of the housing 4, the upper wall 52 of the auxiliary fuel tank 14 and the predetermined portion of the lower portion 3 substantially prevent further downward deformation of the lower wall 8 of the partition wall 6. Similarly, when the upper wall 7 of the partition wall 6 curves upwards and contacts the lower surface of the upper portion 2 of the housing 4, the upper portion 2 substantially prevents further upward deformation of the upper wall 7 of the partition wall 6.

That is, the lower wall 8 and the upper wall 7 of the partition wall 6 are prevented from excessively curving beyond a predetermined allowance of deformation by the upper wall 52 of the auxiliary fuel tank 14, the predetermined portion of the lower portion 3 of the housing 4, and the upper portion 2 of the housing 4. The upper wall 7 and the lower wall 8 are thereby protected from damage and breakage. Furthermore, since the upper wall 52 of the auxiliary fuel tank 14 is utilized to prevent excessive deformation of the lower wall 8, a dead space below the partition wall 6 can be substantially eliminated and the fuel tank 1 can be correspondingly reduced in size.

This embodiment is designed so that fuel supply into the fuel storing chamber 5 via the fuel supplying pipe 10 is stopped when the lower wall 8 of the partition wall 6 contacts the upper surface of the upper wall 52 of the auxiliary fuel tank 14 and the upper surface the predetermined portion of the lower portion 3 of the housing 4, and the upper wall 7 of the partition wall 6 contacts the lower surface of the upper portion 2 of the housing 4. That is, the upper wall 52 of the auxiliary fuel tank 14, the predetermined portion of the lower portion 3 of the housing 4 and the upper portion 2 of the housing 4 determine a maximum fuel storing capacity of the fuel storing chamber 5.

Since fuel supply into the fuel storing chamber 5 is stopped when the amount of fuel in the fuel storing chamber 5 reaches the maximum capacity of the fuel storing chamber 5, a problem will occur if the embodiment adopts a construction in which the fuel introducing pipe 20 is connected to one of the upper wall 7, the lower wall 8 and the side walls 9a–9d so that fuel is supplied from the fuel supplying pipe 10 into the auxiliary fuel tank 14 via the fuel storing chamber 5 and the fuel introducing pipe 20 and, at the time of fuel discharge, fuel is discharged from the fuel storing chamber 5 into the auxiliary fuel tank 14 via the fuel introducing pipe 20 connected to the fuel storing chamber 5. The problem is that the auxiliary fuel tank 14 will not be filled yet when the maximum capacity of the fuel storing chamber 5 is reached and fuel supply is stopped.

However, the embodiment adopts a construction in which the fuel introducing pipe 20 branches from the fuel supplying pipe 10, so that fuel is substantially directly supplied from the fuel supplying pipe 10 into the auxiliary fuel tank 14 via the fuel introducing pipe 20, as described above. Therefore, it is ensured that the auxiliary fuel tank 14 will be filled with fuel before the maximum fuel storing capacity of the fuel storing chamber 5 is reached.

Figure 8:
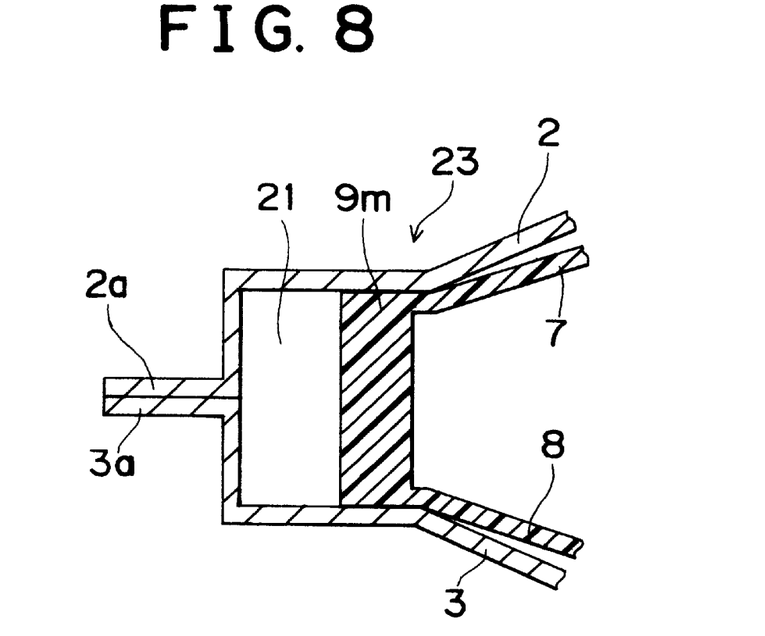
FIG. 8 is an enlarged sectional view of a peripheral portion of the fuel tank corresponding to a corner portion of the partition wall.
Figure 9:
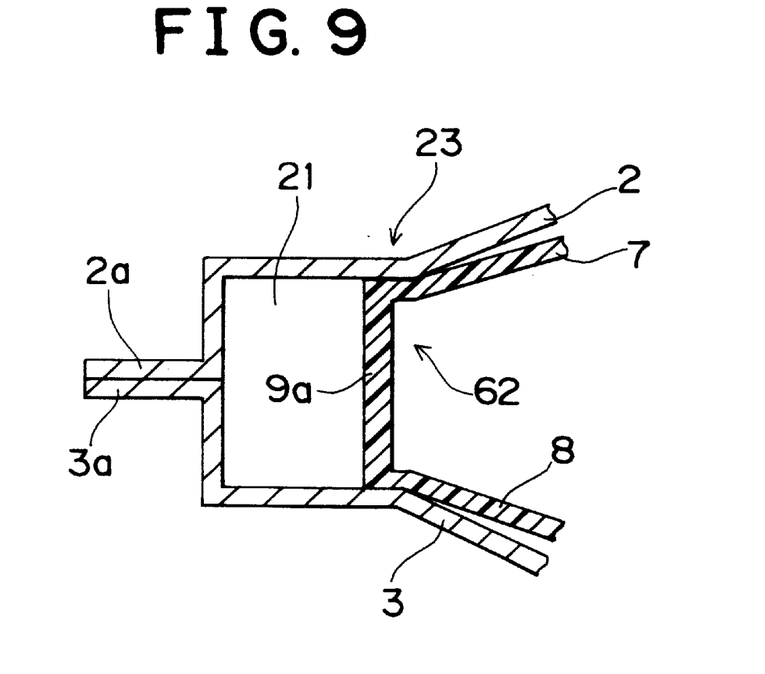
FIG. 9 is an enlarged sectional view a peripheral portion of the fuel tank corresponding to a portion of the partition wall other than the corner portions thereof.

As can be seen in FIGS. 1, 8 and 9, a gap 21 having substantially the same height as the side walls 9a–9d of the partition wall 6 is defined by the side walls 9a–9d and the upper portion 2 and the lower portion 3 of the housing 4. The gap 21 extends along an inner surface of the entire joint peripheral portions of the upper portion 2 and the lower portion 3 of the housing 4. The gap 21 houses the jaw portions 9m–9p of the partition wall 6 (see FIG. 8), and also houses the side walls 9a–9d and the connecting portions of the upper and lower walls 7, 8 to the side walls 9a–9d (see FIG. 9). Hereinafter, the connecting portions of the upper and lower walls 7, 8 to the side walls 9a–9d will be considered as extended portions of the side walls 9a–9d, and the connecting portions of the upper and lower walls 7, 8 and the side walls 9a–9d will be collectively referred to as "side wall-equivalent portion 62").

The upper portion 2 and the lower portion 3 of the housing 4 thus sandwich the jaw portions 9m–9p and the side wall-equivalent portion 62 of the partition wall 6, and therefore support the partition wall 6 so that the partition wall 6 can slide in horizontal directions relative to the housing 4. That is, the joint peripheral portions of the upper portion 2 and the lower portion 3 of the housing 4 form a clamp portion 23 that clamps the jaw portions 9m–9p and the side wall-equivalent portion 62 of the partition wall 6 slidably in horizontal directions (see FIGS. 8 and 9).

The jaw portions 9m–9p and the side wall-equivalent portion 62 slide horizontally relative to the clamp portion 23 when the upper wall 7 and the lower wall 8 undergo curving deformation. At the time of curving deformation of the upper and lower walls 7, 8, the upward and downward displacement of the connecting portions of the upper and lower walls 7, 8 to the side walls 9a–9d is very small, and the displacement of portions of the connecting portions adjacent to the jaw portions 9m–9p is still smaller. Therefore, the clamp portion 23 does not considerably hinder the upper and lower walls 7, 8 from curving upward or downward.

Since the partition wall 6 is supported at the jaw portions 9m–9p and the side wall-equivalent portion 62 by the housing 4, the partition wall 6 is allowed to undergo upward and downward deformation in accordance with the amount of fuel stored in the fuel storing chamber 5. The partition wall 6 may also be supported only at the jaw portions 9m–9p by the housing 4.

Figure 10:
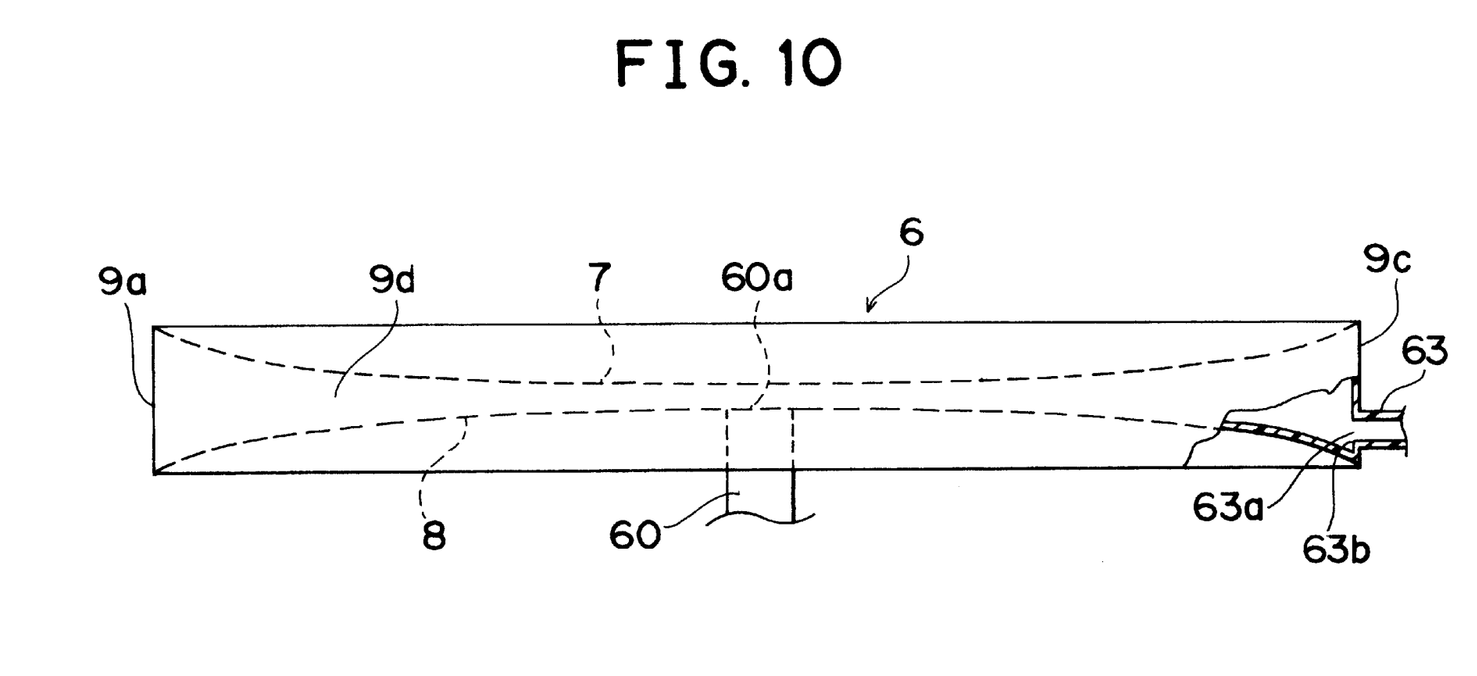
FIG. 10 is a partially cutaway elevational view of the partition wall, a portion of residual fuel discharging pipe and a portion of the fuel pipe in the fuel tank of the first embodiment, illustrating a state that the amount of fuel in the fuel storing chamber is small.

As shown in FIG. 2, an opening 63a is formed in the side wall 9 of the partition wall 6, at a position near the joint portion 9f (a corner portion of the partition wall 6) and near the lower end of the side wall 9c, in this embodiment. As shown in FIGS. 1 and 10, a residual fuel discharging pipe (residual fuel discharging passage) 63 is connected to the opening 63a.

The residual fuel discharging pipe 63 has a smaller diameter than the fuel pipe 60. The residual fuel discharging pipe 63 is welded to the side wall 9c of the partition wall 6, or formed together with the partition wall 6. The residual fuel discharging pipe 63 is connected to the bellows fuel introducing pipe 20 (see FIGS. 1 and 7). The residual fuel discharging pipe 63 may be connected to any one of the side walls 9a–9d.

As shown in FIG. 10, the residual fuel discharging pipe 63 is connected to the side wall 9c in such a manner that a lower side edge portion 63b of the opening 63a of the residual fuel discharging pipe 63 in the side wall 9c is lower than an opening 60a of the fuel pipe 60 formed in the lower wall 8 of the partition wall 6, when a maximum upward deformation of the lower wall 8 is reached (also before the maximum upward deformation is reached).

In the fuel tank 1 constructed as described above, when fuel is supplied into the partition wall 6 having a generally rectangular parallelepipedal basic shape as shown in FIG. 2 via the fuel supplying pipe 10 so that the amount of fuel in the fuel storing chamber 5 exceeds the aforementioned predetermined amount, the upper wall 7 and the lower wall 8 curve upwards and downwards, respectively, and the side walls 9a–9d curve inwards, as shown in FIG. 3. The curvature of the walls gradually increases with increases in the amount of fuel stored in the fuel storing chamber 5, until the maximum amount of fuel is stored in the fuel storing chamber 5. At this moment, the auxiliary fuel tank 14 has been filled with fuel.

Therefore, the fuel tank 1 of this embodiment enables storage of more fuel in the fuel storing chamber 5 of the partition wall 6 than a fuel tank in which an upper wall 7 and a lower wall 8 do not curve upwards and downwards, respectively, with increases in the amount of fuel stored.

At the time of fuel discharge, the fuel pump 16 is operated to pump out fuel from the fuel storing chamber 5 to the fuel injection valves of the internal combustion engine via the fuel pipe 60, the fuel introducing pipe 20, the filter 17, and the fuel conveying pipe 15. As the amount of fuel in the fuel storing chamber 5 decreases, the upward curvature of the upper wall 7, the downward curvature of the lower wall 8 and the inward curvatures of the side walls 9a–9d gradually reduce. The partition wall 6 resumes the generally rectangular parallelepiped shape as shown in FIG. 2 when the amount of fuel in the fuel storing chamber 5 decreases to the aforementioned predetermined amount.

When fuel is further pumped out of the fuel storing chamber 5 so that the amount of fuel in the fuel storing chamber 5 becomes less than the predetermined amount, the upper wall 7 and the lower wall 8 curve downwards and upwards, respectively, and the side walls 9a–9d curve inwards, as shown in FIG. 5, due to negative pressure caused by suction or pumping. The curvatures of these walls gradually increase with decreases in the amount of fuel in the fuel storing chamber 5. The progress of curving deformation of the walls is restrained when the upper wall 7 and the lower wall 8 closely contact at their substantially central portions as shown in FIG. 6. At this moment, the fuel storing chamber 5 has a shrunken shape as shown in FIG. 6, and it is filled with fuel without any gaseous space left therein.

Therefore, in comparison with a fuel tank in which neither an upper wall 7 nor a lower wall 8 curves with decreases in the amount of fuel stored, the fuel tank 1 of the embodiment reduces the gaseous space volume in the fuel storing chamber 5 by an amount corresponding to the capacity reduction of the fuel storing chamber 5 caused by the curvatures of the walls of the fuel storing chamber 5.

If fuel is further drawn from the fuel storing chamber 5 by the fuel pump 16 after the upper wall 7 and the lower wall 8 closely contact at their substantially central portions due to a decrease in the amount of fuel in the fuel storing chamber 5, an amount of fuel present near a peripheral end portion of the upper wall 7 is discharged via the opening 60a of the fuel pipe 60. In this state, however, because the upper wall 7 and the lower wall 8 do not further deform, and because the opening 60a of the fuel pipe 60 is located at the uppermost position due to the upward curvature of the lower wall 8, a certain amount of fuel cannot be discharged via the opening 60a, but remains around the opening 60a, more specifically, near a peripheral end portion of the lower wall 8 of the fuel storing chamber 5.

However, in this embodiment, the residual fuel discharging pipe 63 is connected to the side wall 9c at such a position that the lower side edge portion 63b of the opening 63a of the pipe 63 in the side wall 9c becomes lower than the opening 60a of the fuel pipe 60 formed in the lower wall 8, at the time of the maximum upward curvature of the lower wall 8, as described above. Therefore, an amount of fuel remaining in the fuel storing chamber 5 after the maximum upward curvature of the lower wall 8 is discharged into the auxiliary fuel tank 14 via the residual fuel discharging pipe 63, and then pumped out to the fuel injection valves of the internal combustion engine.

In the embodiment, an amount of fuel that cannot be discharged via the fuel pipe 60 but remains near the peripheral end portion of the lower wall 8 of the fuel storing chamber 5 due to the wall curvature can be discharged via the residual fuel discharging pipe 63. Therefore, the residual fuel amount of the fuel storing chamber 5 is minimized. Hence, a predetermined effective fuel capacity of the fuel storing chamber 5 is secured. Furthermore, since the fuel storing chamber 5 is provided with the plurality of fuel discharging passages, that is, the fuel pipe 60 and the residual fuel discharging pipe 63, fuel discharge from the fuel storing chamber 5 is not easily affected by the posture of the vehicle or the like.

In the preferred embodiment, the residual fuel discharging pipe 63 is connected to a portion of a side wall of the partition wall 6, the portion being near a corner portion of the partition wall 6, because the portion of the side wall undergoes least deformation. However, this connecting position of the residual fuel discharging pipe 63 is not restrictive. For example, the residual fuel discharging pipe 63 may also be connected to a central portion of a side wall in the direction of the length of the side wall.

Figure 11:
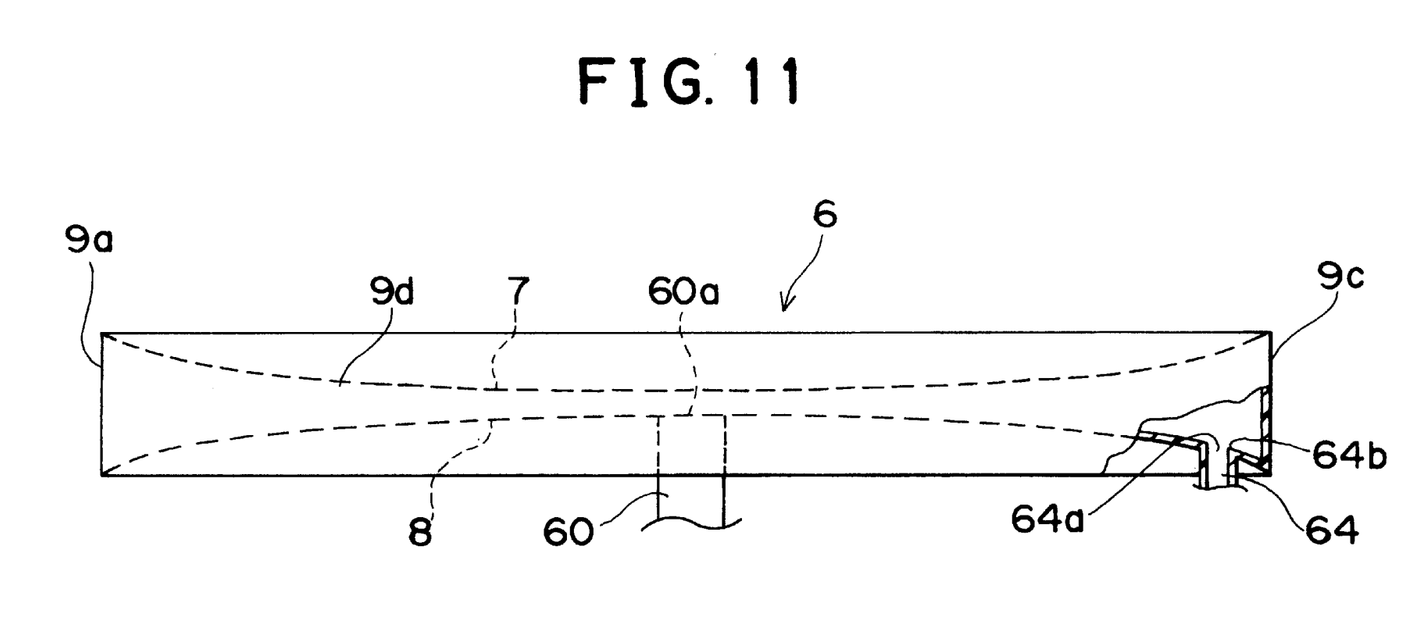
FIG. 11 is a partially cutaway elevational view of the partition wall, a portion of residual fuel discharging pipe and a portion of the fuel pipe in the fuel tank of a second embodiment, illustrating a state that the amount of fuel in the fuel storing chamber is small.

FIG. 11 is a partially cutaway elevational view of a partition wall of a fuel tank according to a second embodiment, wherein a portion of a residual fuel discharging pipe and a portion of a fuel pipe are also shown.

The fuel tank of the second embodiment differs from that of the first embodiment in that a residual fuel discharging pipe 64 is connected to a lower wall 8 of the partition wall 6 in the second embodiment, instead of the residual fuel discharging pipe 63 connected to the side wall 9c in the first embodiment.

The residual fuel discharging pipe 64 is connected to the lower wall 8, at a position adjacent to a corner portion of the partition wall 6, so that at the time of the maximum upward curvature of the lower wall 8, a lower side edge portion 64b of an opening 64a of the residual fuel discharging pipe 64 in the lower wall 8 is lower than the opening 60a of the fuel pipe 60 formed in the lower wall 8.

This pipe connection also ensures that an amount of fuel that cannot be discharged via the fuel pipe 60 but remains near a peripheral end portion of the lower wall 8 of the fuel storing chamber 5 due to an upward curvature of the lower wall 8 will be discharged via the residual fuel discharging pipe 64, thereby achieving substantially the same advantages as achieved by the first embodiment.

Although in this preferred embodiment, the residual fuel discharging pipe 64 is connected to a least-deforming portion of the lower wall 8 near a corner portion of the partition wall 6, this connecting position is not restrictive.

Figure 12:
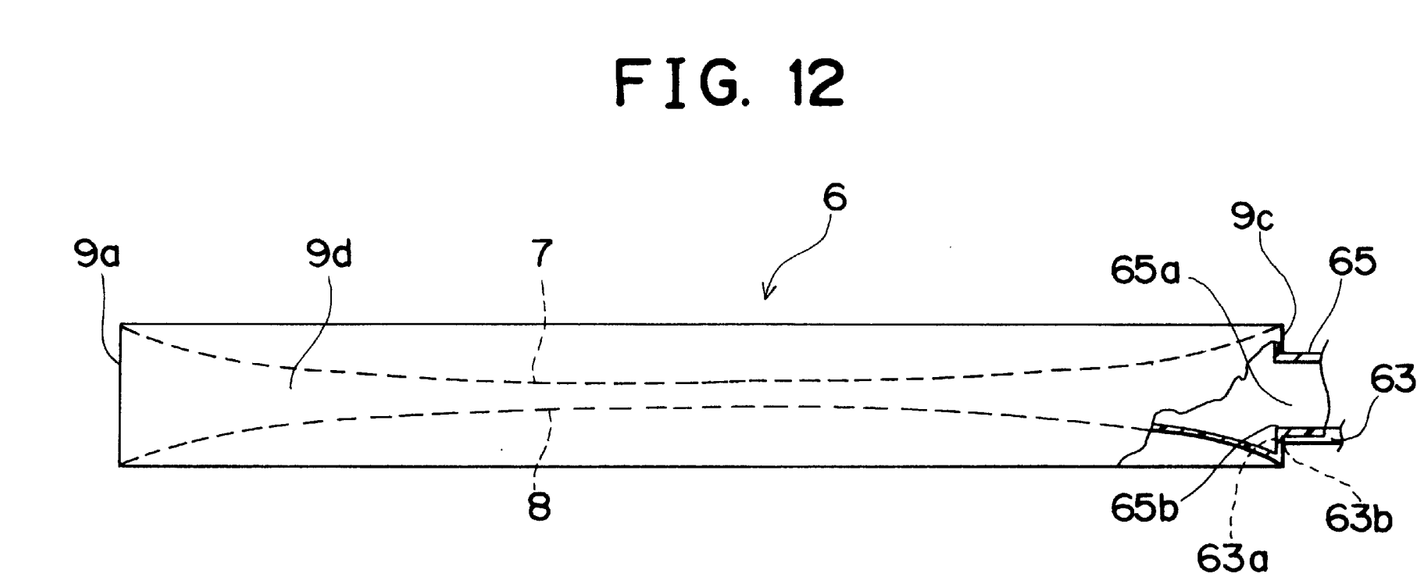
FIG. 12 is a partially cutaway elevational view of the partition wall, a portion of residual fuel discharging pipe and a portion of the fuel pipe in the fuel tank of a third embodiment, illustrating a state that the amount of fuel in the fuel storing chamber is small.

FIG. 12 is a partially cutaway elevational view of a partition wall of a fuel tank of a third embodiment, wherein a portion of a residual fuel discharging pipe and a portion of a fuel pipe are also shown.

The fuel tank of the third embodiment differs from that of the first embodiment in that a fuel pipe 65 is connected to a side wall of the partition wall 6 (e.g., a side wall 9c in FIG. 12) in the third embodiment, instead of the fuel pipe 60 connected to the lower wall 8 in the first embodiment. In the third embodiment, a residual fuel discharging pipe 63 is connected to a side wall (e.g., the side wall 9c in FIG. 12) as in the first embodiment.

In the third embodiment, the residual fuel discharging pipe 63 is connected to the side wall 9c at such a position that a lower side edge 63b of an opening 63a of the residual fuel discharging pipe 63 in the side wall 9c is below a lower side edge portion 65b of an opening 65a of the fuel pipe 65 in the side wall 9c and that, at the time of the maximum upward curvature of the lower wall 8, the lower side edge portion 63b of the opening 63a of the residual fuel discharging pipe 63 becomes lower than an uppermost portion of the lower wall 8.

This pipe connection also ensures that an amount of fuel that cannot be discharged via the fuel pipe 65 but remains near a peripheral end portion of the lower wall 8 of the fuel storing chamber 5 due to an upward curvature of the lower wall 8 will be discharged via the residual fuel discharging pipe 63, thereby achieving substantially the same advantages as achieved by the first embodiment.

Figure 13:
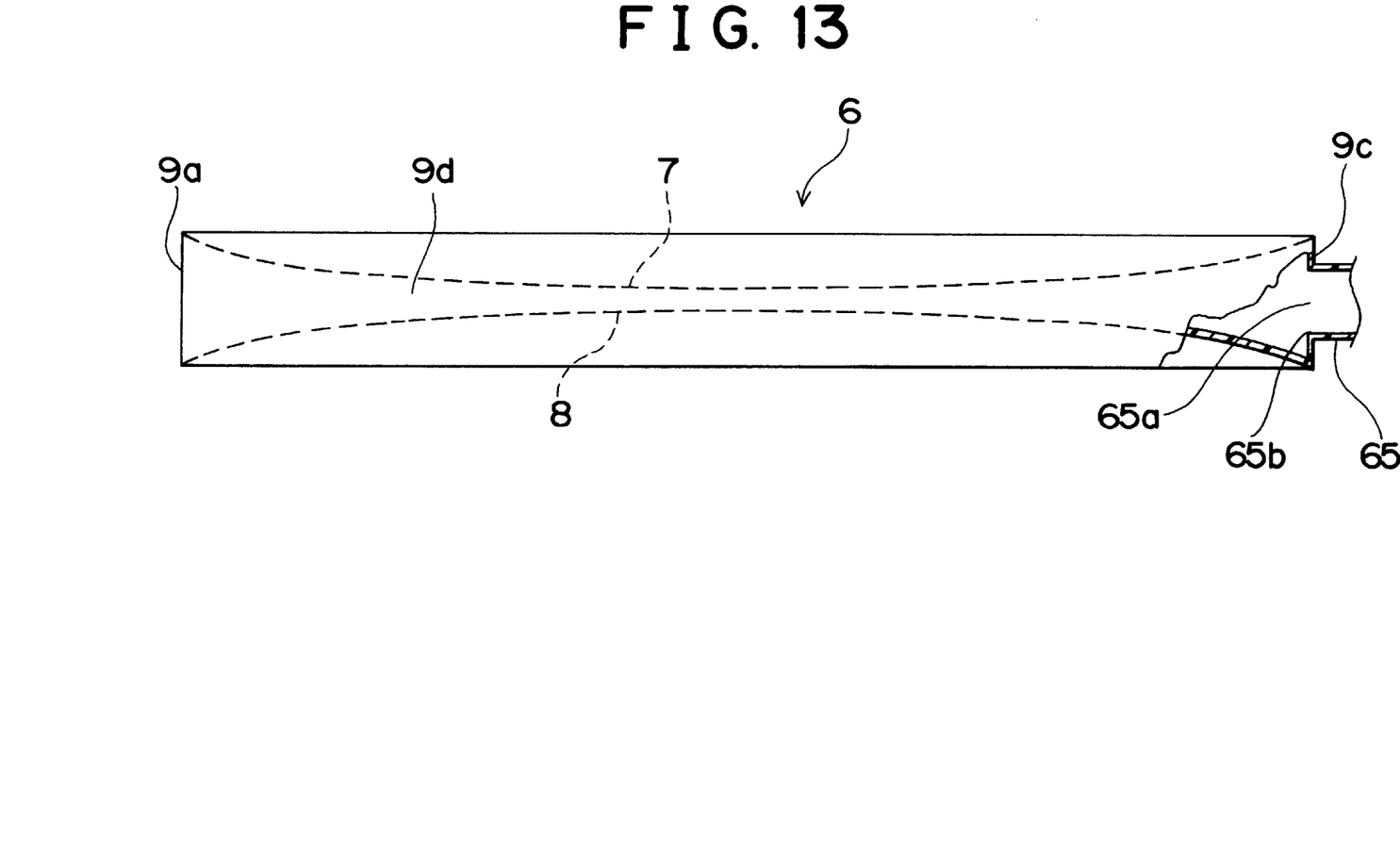
FIG. 13 a partially cutaway elevational view of the partition wall and a portion of the fuel pipe in the fuel tank of a fourth embodiment, illustrating a state that the amount of fuel in the fuel storing chamber is small.

FIG. 13 is a partially cutaway elevational view of a partition wall of a fuel tank of a fourth embodiment, wherein a portion of a fuel pipe is also shown.

The fuel tank of the fourth embodiment differs from the fuel tank of the third embodiment in that the residual fuel discharging pipe 63 connected to a side wall of the partition wall 6 is eliminated. In the fourth embodiment, a fuel pipe 65 is connected to a side wall (e.g., a side wall 9c in FIG. 13) as in the third embodiment.

In the fourth embodiment, the fuel pipe 65 is connected to the side wall 9c at such a position that a lower side edge portion 65b of an opening 65a of the fuel pipe 65 becomes lower than an uppermost portion of a lower wall 8 at the time of the maximum upward curvature of the lower wall 8.

This construction also ensures that an amount of fuel remaining near a peripheral end portion of the lower wall 8 of the fuel storing chamber 5 at the time of an upward curvature of the lower wall 8 will be discharged via the fuel pipe 65, thereby achieving substantially the same advantages as achieved by the first embodiment. Furthermore, since a residual fuel discharging pipe is omitted, the construction can be correspondingly simplified and, therefore, the production cost can be reduced.

Figure 14:
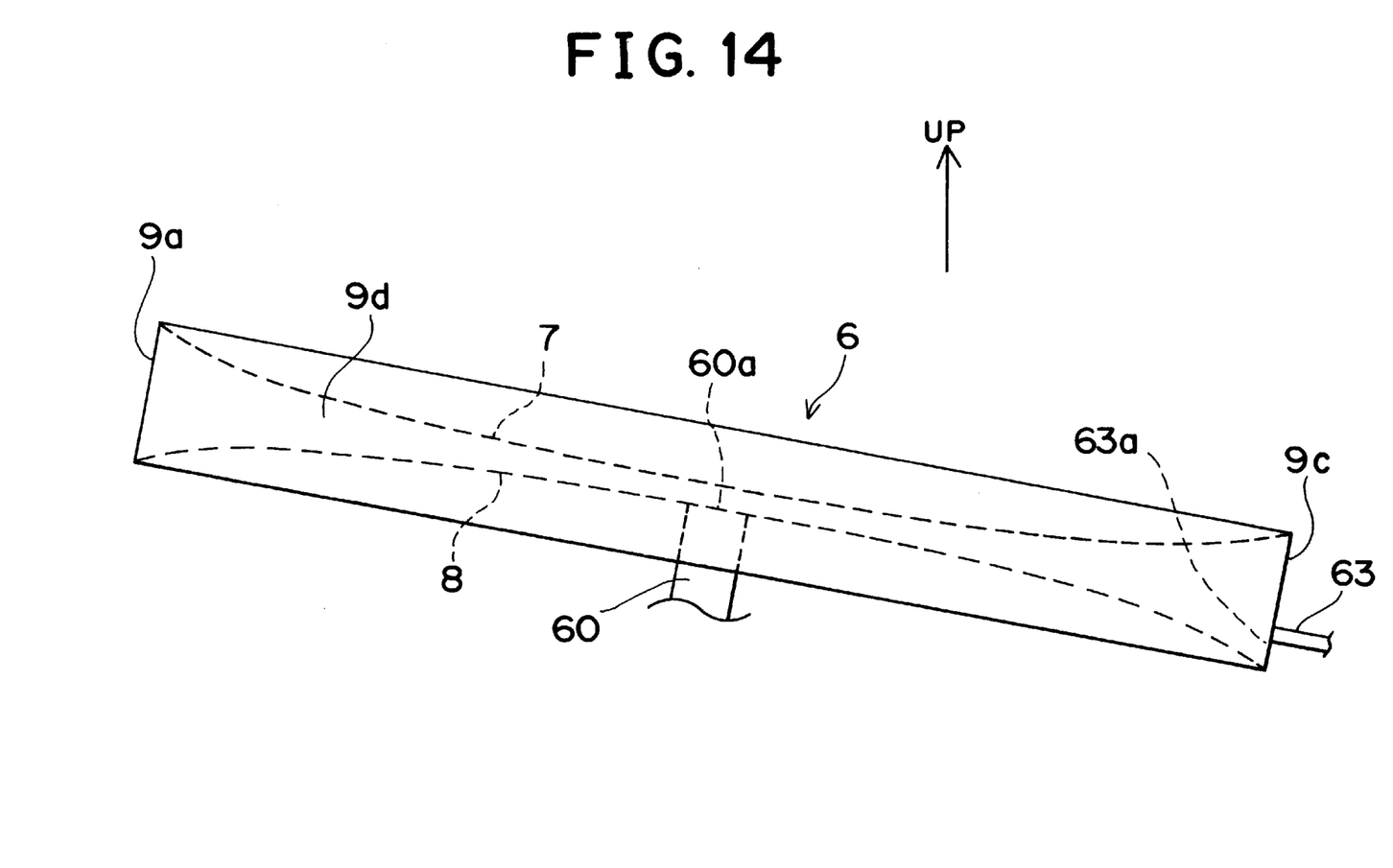
FIG. 14 is a partially cutaway elevational view of the partition wall, a portion of residual fuel discharging pipe and a portion of the fuel pipe in the fuel tank of a fifth embodiment, illustrating a state that the amount of fuel in the fuel storing chamber is small.

FIG. 14 is an elevational view of a partition wall of a fuel tank of a fifth embodiment, wherein a portion of a residual fuel discharging pipe and a portion of a fuel pipe are also shown.

The fuel tank of the fifth embodiment differs from the fuel tank of the first embodiment in that the fuel tank 1 as in the first embodiment is tilted from a horizontal posture in the vehicle. Considering the ease of understanding the illustration, FIG. 14 shows only the partition wall 6 defining a fuel storing chamber 5 therein, and a portion of the residual fuel discharging pipe 63 and a portion of the fuel pipe 60. An arrow UP in the drawing indicates an upward direction relative to the vehicle.

The fuel tank 1 is installed in the vehicle in such a tilted posture that an opening 63a of the residual fuel discharging pipe 63 connected to a side wall (e.g., a side wall 9c in FIG. 14) is located adjacent to a lowermost portion of the partition wall 6.

This embodiment also ensures that an amount of fuel remaining in the fuel storing chamber 5 at the time of an upward curvature of the lower wall 8 will be discharged from the residual fuel discharging pipe 63 connected to a substantially lowermost portion of the partition wall 6, that is, a portion of the partition wall 6 that includes or is adjacent to the lowest point in the partition wall 6, thereby achieving substantially the same advantages as achieved by the first embodiment. Furthermore, due to the tilted posture of the fuel tank, fuel resides in a lower portion of the fuel storing chamber 5, that is, fuel naturally resides near the opening 63a of the residual fuel discharging pipe 63, so that fuel can be efficiently discharged via the residual fuel discharging pipe 63 (a good fuel discharging characteristic is achieved).

The construction of the fifth embodiment may also be applied to the second embodiment, in which the residual fuel discharging pipe 64 is connected to the lower wall 8. It is also possible to support the partition wall 6 in a tilted posture to the housing 4 of the fuel tank 1 and install the fuel tank 1 in a vehicle in a horizontal posture relative to the vehicle. That is, a gist of the fifth embodiment is that the partition wall 6 (fuel storing chamber 5) assumes a tilted posture relative to a vehicle and the residual fuel discharging pipe 63 or 64 is connected to a substantially lowermost portion of the tilted partition wall 6 (fuel storing chamber 5), that is, a portion of the partition wall 6 that includes or is adjacent to the lowest point in the partition wall 6.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention. For example, although in the foregoing embodiments, the residual fuel discharging pipe 63, 64 is connected to the fuel introducing pipe 20, the residual fuel discharging pipe 63, 64 may instead be connected to the auxiliary fuel tank 14 via a bellows pipe or a flexible pipe.

Although in the foregoing embodiments, the partition wall 6 defining the fuel storing chamber 5 therein has a generally rectangular parallelepipedal basic shape, the basic shape of the partition wall 6 may also be other prismal shapes with the upper and lower walls 7, 8 having other polygonal shapes. The shape of the partition wall 6 may be suitably selected in accordance with the shape of an installation space of the partition wall 6.

Although in the first, second and fifth embodiments, the fuel pipe 60 is connected to a substantially central portion of the lower wall 8, the fuel pipe 60 may be connected to any portion of the lower wall 8 as long as the residual fuel discharging pipe 63, 64 can be connected at a position that satisfies the condition described above in conjunction with the first, second or fifth embodiment relative to the opening 60a of the fuel pipe 60 formed in the lower wall 8.

What is claim is:

1. A fuel tank comprising:
   a partition defining a fuel storing chamber, the partition being deformable in accordance with an amount of fuel stored in the fuel storing chamber, the partition including a lower wall which curves upward when the amount of fuel in the fuel storing chamber is decreased;
   a fuel passage open to the fuel storing chamber through the lower wall for supplying fuel to and discharging fuel from the fuel storing chamber wherein, when the lower wall curves upward as the amount of fuel is decreased, a portion of the fuel in the fuel storing chamber is discharged from the fuel storing chamber via the fuel passage, while a remaining portion of the fuel in the fuel storing chamber is directed to a residual fuel discharging passage.

2. A fuel tank according to claim 1, wherein, when the lower wall is curved, a lower side edge portion of an opening of the residual fuel discharging passage into the fuel storing chamber is lower than an opening of the fuel passage to the fuel storing chamber.

3. A fuel tank according to claim 1, wherein the fuel storing chamber is defined by the lower wall, an upper wall having a polygonal shape and facing the lower wall, wherein the lower wall is polygonally shaped and a peripheral wall extending between the upper wall and the lower wall.

4. A fuel tank according to claim 3, wherein the fuel storing chamber has a rectangular parallelepipedal shape.

5. A fuel tank according to claim 1, wherein the residual fuel discharging passage opens into the fuel storing chamber via an opening through the peripheral wall with a lower side edge portion of the opening of the residual fuel discharging passage being lower, at least when the lower wall is curved to a maximum extent, than an opening of the fuel passage formed in the lower wall.

6. A fuel tank according to claim 1, wherein the residual fuel discharging passage opens into the fuel storing chamber via an opening in the lower wall, wherein, when the lower wall is curved to a maximum extent, a lower side edge portion of the opening of the residual fuel discharging passage is lower than an opening of the fuel passage formed in the lower wall.

7. A fuel tank according to claim 1, wherein an opening of the fuel passage into the fuel storing chamber extends through a substantially central portion of the lower wall, and wherein an opening of the residual fuel discharging passage into the fuel storing chamber extends through a portion of the lower wall near a corner portion of the lower wall.

8. A fuel tank according to claim 3, wherein the fuel passage opens into the fuel storing chamber via a first opening in the peripheral wall and the residual fuel discharging passage opens into the fuel storing chamber via a second opening in the peripheral wall so that, when the lower wall is curved to a maximum extent, a lower side edge portion of the second opening is lower than an uppermost portion of the lower wall and is lower than a lower side edge portion of the first opening.

9. A fuel tank according to claim 1, wherein the residual fuel discharging passage discharges the remaining portion of fuel into the fuel passage.

10. A fuel tank according to claim 1, further comprising an auxiliary fuel tank connected to the residual fuel discharging passage, the auxiliary fuel tank temporarily storing the remaining amount of fuel.

11. A fuel tank comprising:
   a partition defining a fuel storing chamber, the partition being deformable in accordance with an amount of fuel stored in the fuel storing chamber; and
   a fuel passage connected to the fuel storing chamber for supplying fuel to and discharging fuel from the fuel storing chamber,
   wherein the fuel storing chamber is defined by an upper wall having a polygonal shape, a lower wall having a polygonal shape and facing the upper wall, and a peripheral wall extending between the upper wall and the lower wall, the lower wall curving upward in accordance with a decrease in an amount of fuel present in the fuel storing chamber, the fuel passage opening into the fuel storing chamber via an opening in the peripheral wall wherein, when the lower wall is curved upward in response to a decrease in the amount of fuel in the fuel storing chamber, a lower side edge portion of the opening of the fuel passage is lower than an uppermost portion of the lower wall.

12. A fuel tank-equipped vehicle comprising:
   a fuel tank including a partition deformable in accordance with an amount of fuel stored in a fuel storing chamber defined by the partition, a fuel passage being connected to the fuel storing chamber through a lower wall of the partition for supplying the fuel to and discharging fuel from the fuel storing chamber, and a residual fuel discharging passage,
   wherein when a portion of fuel in the fuel storing chamber is discharged via the fuel passage, an upward curvature of a lower wall of the fuel storing chamber occurs and a remaining amount of fuel is directed to the residual fuel discharge passage, and
   wherein the fuel storing chamber is tilted relative to a horizontal direction, and the residual fuel discharging passage is connected to a substantially lowermost portion of the fuel storing chamber.

* * * * *